(12) United States Patent
Kinoshita

(10) Patent No.: US 6,445,135 B2
(45) Date of Patent: Sep. 3, 2002

(54) ELECTRIC-DISCHARGE LAMP CONTROL APPARATUS AND ELECTRIC-DISCHARGE LAMP CONTROL METHOD

(75) Inventor: Hidehiko Kinoshita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/891,353

(22) Filed: Jun. 27, 2001

Related U.S. Application Data

(63) Continuation of application No. PCT/JP99/06119, filed on Nov. 2, 1999.

(51) Int. Cl.[7] .............................................. H05B 41/00
(52) U.S. Cl. ...................... 315/119; 315/308; 315/82; 315/DIG. 7
(58) Field of Search ................................. 315/308, 307, 315/291, 224, 225, 82, 119, DIG. 5, DIG. 7

(56) References Cited

U.S. PATENT DOCUMENTS

| | | | |
|---|---|---|---|
| 5,422,548 A | * | 6/1995 | Yamashita et al. .......... 315/308 |
| 5,880,563 A | * | 3/1999 | Toyama et al. ............. 315/225 |
| 5,973,457 A | * | 10/1999 | Yamashita et al. .......... 315/225 |

FOREIGN PATENT DOCUMENTS

| | | | |
|---|---|---|---|
| JP | 62-292549 | * 12/1987 | |
| JP | 4-12496 | 1/1992 | ........... H05B/41/29 |
| JP | 4-119997 | 10/1992 | ........... H05B/41/18 |
| JP | 8-106986 | 4/1996 | ........... H05B/41/16 |
| JP | 10-312896 | 11/1998 | ........... H05B/41/29 |

* cited by examiner

Primary Examiner—Haissa Philogene
Assistant Examiner—Ephrem Alemu
(74) Attorney, Agent, or Firm—Sughrue Mion, PLLC

(57) ABSTRACT

A flickering number in an electric-discharge lamp 7 is counted in a flickering number counting unit 23a, a flickering number in an electric-discharge lamp 8 is counted in a flickering number counting unit 23b, and the lighting of the electric-discharge lamp 7 or 8 is inhibited by a lamp-lighting inhibiting unit 24a or 24b in cases where the flickering number in the electric-discharge lamp 7 or 8 exceeds a regular number.

7 Claims, 4 Drawing Sheets

ELECTRIC-DISCHARGE LAMP CONTROL APPARATUS AND ELECTRIC-DISCHARGE LAMP CONTROL METHOD

CROSS-REFERENCE TO The RELATED APPLICATION

This application is a continuation of International Application No. PCT/JP99/06119, whose International filing date is Nov. 2, 1999, the disclosures of which Application are incorporated by reference herein, and which International Application was not published in English.

BACKGROUND OF THE INVENTION

1. Field of the Invention

The present invention relates to an electric-discharge lamp control apparatus and an electric-discharge lamp control method in which the electric-discharge lamp is prevented from flickering.

2. Description of Related Art

In a conventional electric-discharge lamp control apparatus, a voltage applied to an electric-discharge lamp is monitored in an abnormal state judging circuit, and the applied voltage is compared with various reference voltages.

Thereafter, when an abnormal state is detected according to a comparison result in the abnormal state judging circuit of the conventional electric-discharge lamp control apparatus, the electric-discharge lamp is put out by the conventional electric-discharge lamp control apparatus.

The technique in the conventional electric-discharge lamp control apparatus is disclosed in the Published Unexamined Japanese Patent Application No. H8-106986 (1996).

Because the conventional electric-discharge lamp control apparatus has the above-described configuration, a life end of the electric-discharge lamp can be detected. However, when an abnormal state such as the flickering of the electric-discharge lamp occurs because an abnormal circumstance occurs in a peripheral circuit of the electric-discharge lamp, the lighting of the electric-discharge lamp cannot be inhibited. Therefore, there is a problem that the life of the electric-discharge lamp cannot be prevented from being shortened.

SUMMARY OF THE INVENTION

An object of the present invention is to provide, with due consideration to the drawbacks of the conventional electric-discharge lamp control apparatus and the conventional electric-discharge lamp control method, an electric-discharge lamp control apparatus and an electric-discharge lamp control method in which the life of an electric-discharge lamp is prevented from being shortened according to the flickering of the lamp.

An electric-discharge lamp control apparatus according to the present invention comprises counting means for counting a flickering number in an electric-discharge lamp which flickers according to the control of lamp-lighting control means, and lamp-lighting inhibiting means for inhibiting the lighting of the electric-discharge lamp in a case where the flickering number counted by the counting means exceeds a regular number.

Accordingly, the life of the electric-discharge lamp can be prevented from being shortened.

In the electric-discharge lamp control apparatus according to the present invention, the flickering number counted by the counting means is reset each time a regular time passes, and the lighting of the electric-discharge lamp is inhibited in a case where the flickering number counted within the regular time exceeds the regular number.

Accordingly, in cases where the electric-discharge lamp flickers according to the will of a user, the lighting of the electric-discharge lamp is not inhibited. However, the lighting of the electric-discharge lamp can be inhibited in an only case where a failure occurs.

In the electric-discharge lamp control apparatus according to the present invention, the lighting of the electric-discharge lamp is inhibited in an only case where a flickering time period determined by the light-out and the lighting of the electric-discharge lamp is shorter than a regular time period.

Accordingly, in cases where the electric-discharge lamp flickers according to the will of a user, the lighting of the electric-discharge lamp is not inhibited. However, the lighting of the electric-discharge lamp can be inhibited in an only case where a failure occurs.

An electric-discharge lamp control method according to the present invention comprises the steps of counting a flickering number in an electric-discharge lamp, and inhibiting the lighting of the electric-discharge lamp in a case where the flickering number exceeds a regular number.

Accordingly, the life of the electric-discharge lamp can be prevented from being shortened.

In the electric-discharge lamp control method according to the present invention, the flickering number is reset each time a regular time passes, and the lighting of the electric-discharge lamp is inhibited in a case where the flickering number counted within the regular time exceeds the regular number.

Accordingly, in cases where the electric-discharge lamp flickers according to the will of a user, the lighting of the electric-discharge lamp is not inhibited. However, the lighting of the electric-discharge lamp can be inhibited in an only case where a failure occurs.

In the electric-discharge lamp control method according to the present invention, the lighting of the electric-discharge lamp is inhibited in an only case where a flickering time period determined by the light-out and the lighting of the electric-discharge lamp is shorter than a regular time period.

Accordingly, in cases where the electric-discharge lamp flickers according to the will of a user, the lighting of the electric-discharge lamp is not inhibited. However, the lighting of the electric-discharge lamp can be inhibited in an only case where a failure occurs.

DETAILED DESCRIPTION OF THE PREFERRED EMBODIMENTS

The invention will now be described with reference to the accompanying drawings.

Embodiment 1

Figure 1:
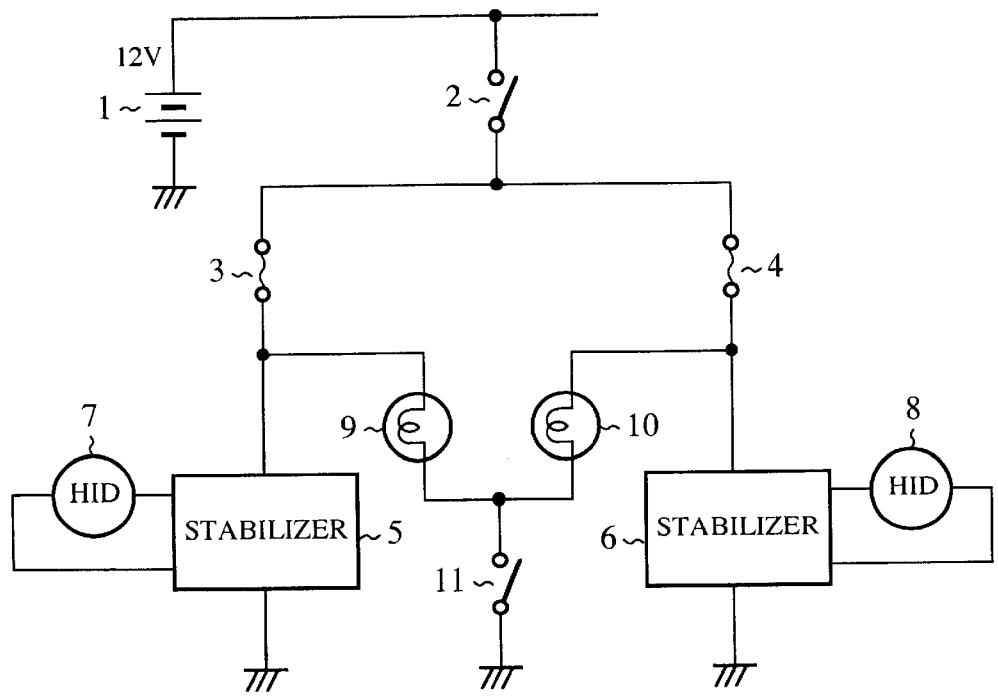
FIG. 1 is a circuit diagram of a headlight of a vehicle, to which an electric-discharge lamp control apparatus is applied, according to a first embodiment of the present invention.

FIG. 1 is a circuit diagram of a headlight of a vehicle, to which an electric-discharge lamp control apparatus is applied, according to a first embodiment of the present invention. In FIG. 1, 1 indicates a battery from which a direct current of 12 V is output. 2 indicates a change-over switch for putting on or out a headlight. The headlight comprises an electric-discharge lamp 7, another electric-discharge lamp 8, a halogen lamp 9 and another halogen lamp 10. 3 indicates a fuse. 4 indicates another fuse. 5 indicates a stabilizer of the electric-discharge lamp 7. 6 indicates a stabilizer of the electric-discharge lamp 8. 7 indicates one electric-discharge lamp (shown by HID). 8 indicates the other electric-discharge lamp (shown by HID). 9 indicates one halogen lamp. 10 indicates the other halogen lamp. 11 indicates a selector switch for selecting a low beam (the electric-discharge lamps 7 and 8 are put on, and the halogen lamps 9 and 10 are put out) or a high beam (the electric-discharge lamps 7 and 8 and the halogen lamps 9 and 10 are put on).

Figure 2:
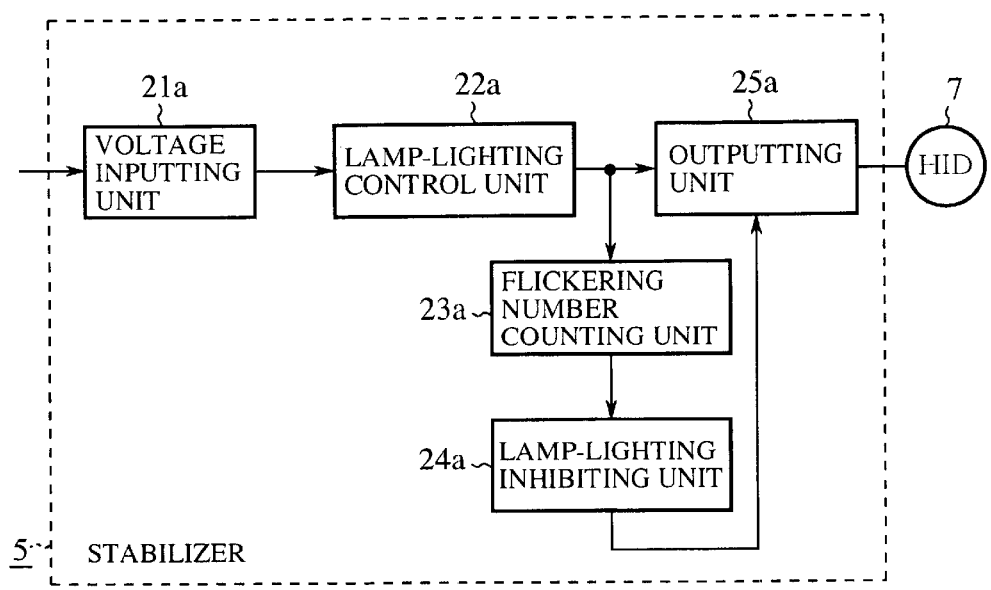
FIG. 2 is a block diagram of the electric-discharge lamp control apparatus according to the first embodiment of the present invention.
Figure 2:
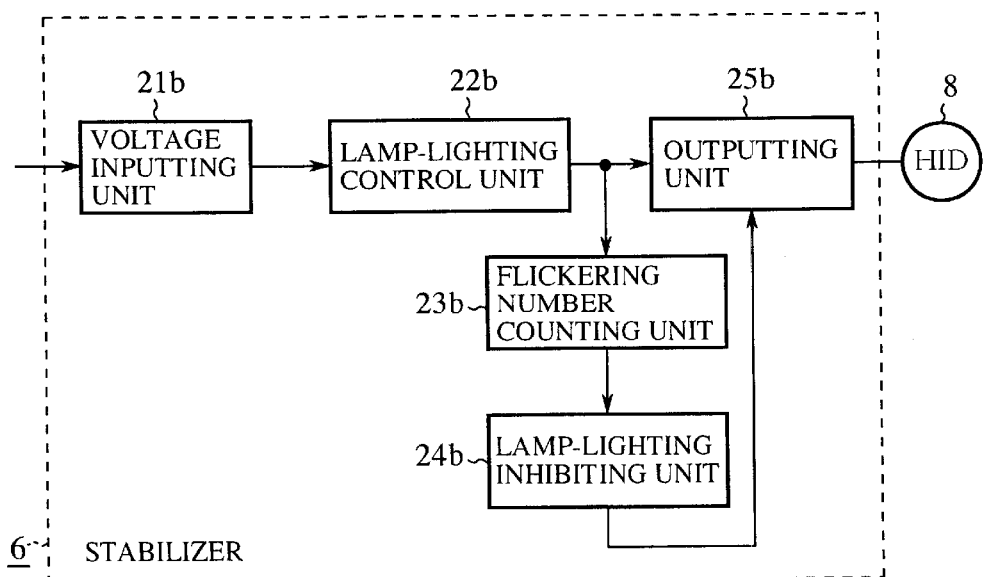

FIG. 2 is a block diagram of the electric-discharge lamp control apparatus according to the first embodiment of the present invention. In FIG. 2, 21a indicates a voltage inputting unit for receiving a voltage to be applied to the stabilizer 5 of the electric-discharge lamp 7. 21b indicates a voltage inputting unit for receiving a voltage to be applied to the stabilizer 6 of the electric-discharge lamp 8. 22a indicates a lamp-lighting control unit (or a lamp-lighting control means) for monitoring a voltage received in the voltage inputting unit 21a, outputting a light-out instruction to put out the electric-discharge lamp 7, in cases where the voltage is out of an allowed voltage range, and outputting a re-lighting instruction to again put on the electric-discharge lamp 7 in cases where the voltage returns within the allowed voltage range. 22b indicates a lamp-lighting control unit (or a lamp-lighting control means) for monitoring a voltage received in the voltage inputting unit 21b, outputting a light-out instruction to put out the electric-discharge lamp 8, in cases where the voltage is out of the allowed voltage range, and outputting a re-lighting instruction to again put on the electric-discharge lamp 8 in cases where the voltage returns within the allowed voltage range. 23a indicates a flickering number counting unit (or a counting means) for counting the number of flicker operations (called a flickering number) performed in the electric-discharge lamp 7. 23b indicates a flickering number counting unit (or a counting means) for counting the number of flicker operations (called a flickering number) performed in the electric-discharge lamp 8. 24a indicates a lamp-lighting inhibiting unit (or a lamp-lighting inhibiting means) for inhibiting the lighting of the electric-discharge lamp 7 in cases where the flickering number counted in the flickering number counting unit 23a exceeds a regular number. 24b indicates a lamp-lighting inhibiting unit (or a lamp-lighting inhibiting means) for inhibiting the lighting of the electric-discharge lamp 8 in cases where the flickering number counted in the flickering number counting unit 23b exceeds the regular number. 25a indicates an outputting unit for putting out or again putting on the electric-discharge lamp 7 according to the instruction output from the lamp-lighting control unit 22a. 25b indicates an outputting unit for putting out or again putting on the electric-discharge lamp 8 according to the instruction output from the lamp-lighting control unit 22b.

Figure 3:
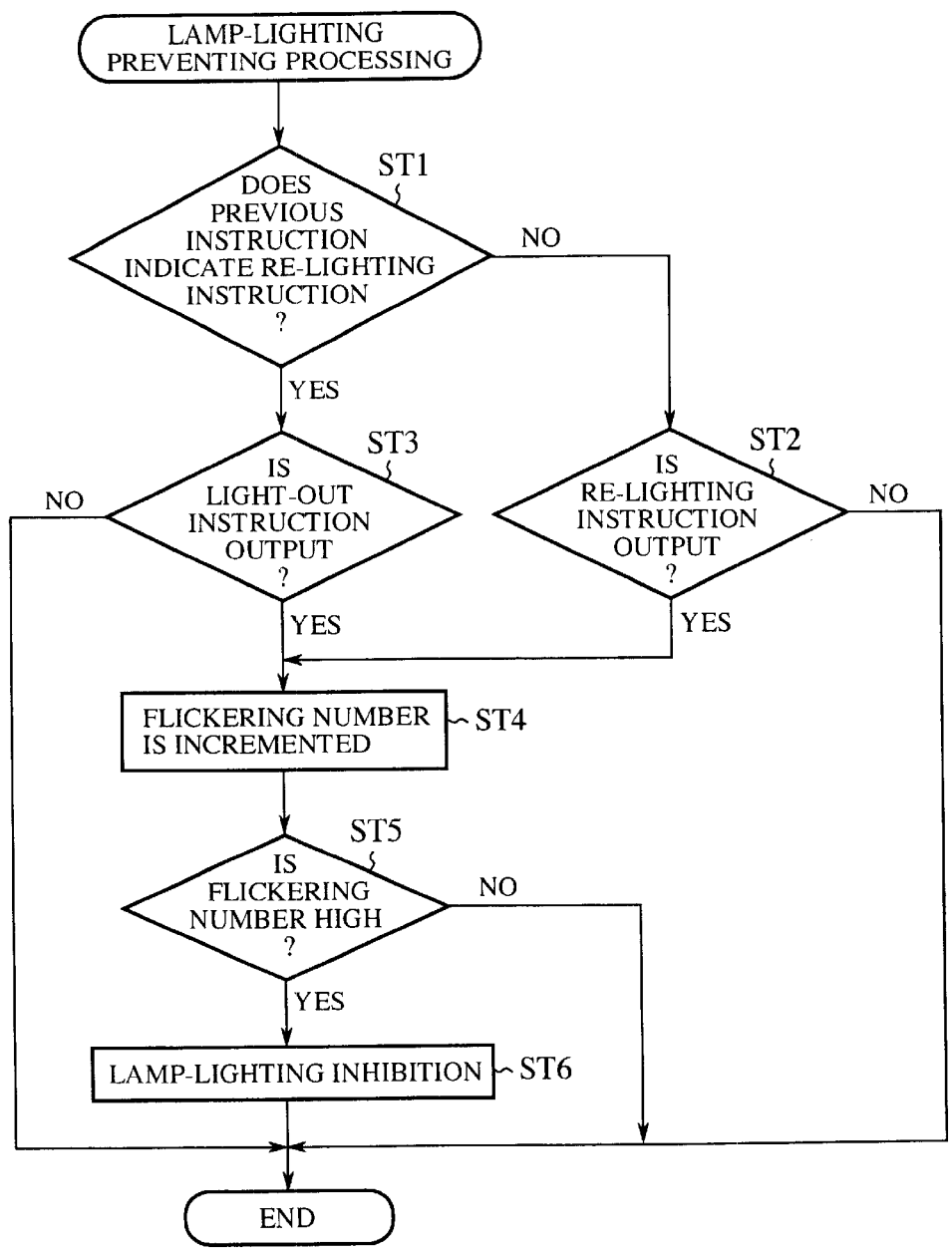
FIG. 3 is a flow chart of an electric-discharge lamp control method according to the first embodiment of the present invention.

FIG. 3 is a flow chart of an electric-discharge lamp control method according to the first embodiment of the present invention.

Next, an operation is described.

Initially, when a user turns on the change-over switch 2 of the headlight, a battery voltage of 12 V is applied to the stabilizers 5 and 6 of the electric-discharge lamps 7 and 8. Therefore, a light is put to each of the electric-discharge lamps 7 and 8. In this case, when the selector switch 11 is set to the "off" state, no electric current flows through the halogen lamp 9 or 10. Therefore, no light is put to the halogen lamp 9 or 10. In contrast, when the selector switch 11 is set to the "on" state, a light is put to each of the halogen lamps 9 and 10.

Figure 4:
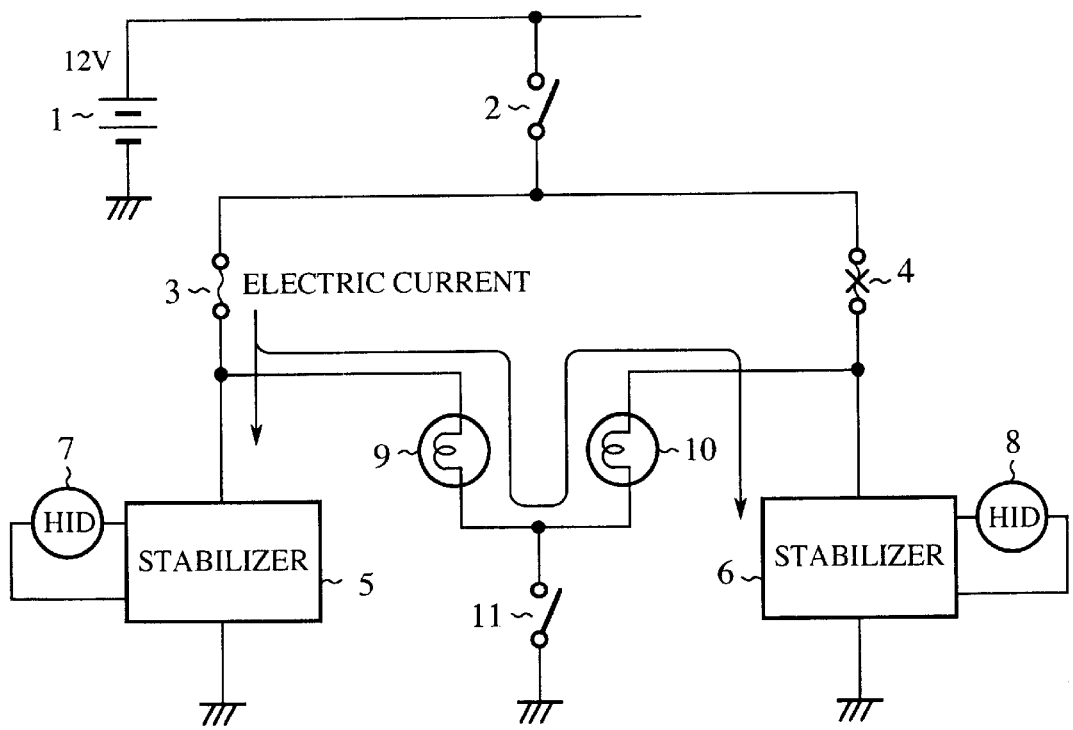
FIG. 4 is a circuit diagram describing the flow of an electric current in case of failure of an electric-discharge lamp.

However, in cases where a failure such as the burn-out of the fuse 4 occurs in the headlight when the electric-discharge lamps 7 and 8 are set in a light-on state, as shown in FIG. 4, a series circuit composed of the halogen lamps 9 and 10 and the stabilizer 6 is formed (in this case, for convenience of explanation, it is assumed that the selector switch 11 is set in the "off" state). Therefore, the battery voltage of 12 V to be applied to the stabilizer 6 is divided by the halogen lamps 9 and 10, and the voltage actually applied to the stabilizer 6 is lowered to almost 2 V.

In cases where an allowed voltage range of the stabilizer 6 is, for example, set in a range from 10 to 14 V, the lamp-lighting control unit 22b detects that the voltage applied to the stabilizer 6 is out of the allowed voltage range, and a light-out instruction is output from the lamp-lighting control unit 22b to the outputting unit 25b to put out the electric-discharge lamp 8.

Therefore, the electric-discharge lamp 8 is put out. In this case, the voltage applied to the stabilizer 6 is returned to 12 V because of the putting-out of the electric-discharge lamp 8. Therefore, the lamp-lighting control unit 22b detects that the voltage applied to the stabilizer 6 is returned within the allowed voltage range, and a re-lighting instruction is output from the lamp-lighting control unit 22b to the outputting unit 25b to put on the electric-discharge lamp 8.

Figure 5:
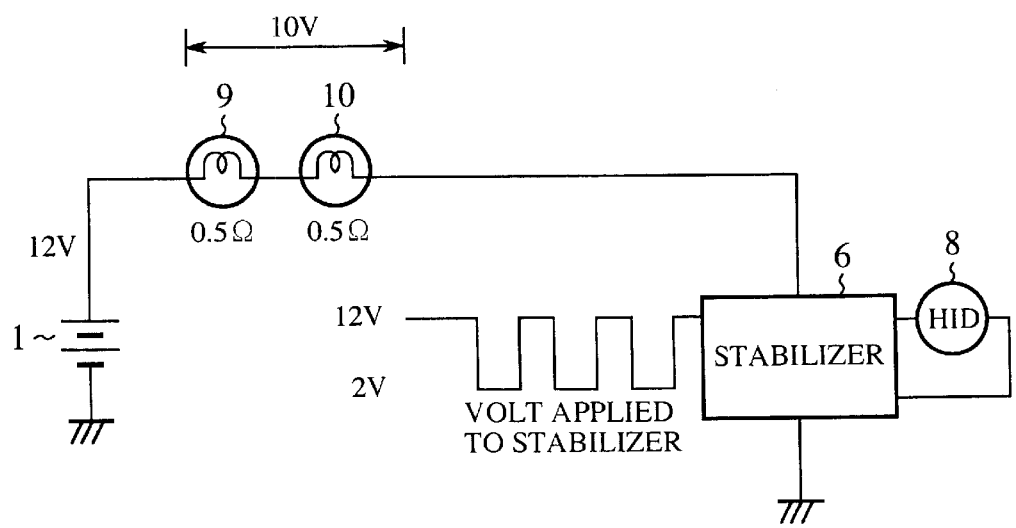
FIG. 5 is a circuit diagram describing a voltage applied to a stabilizer.

As a result, the electric-discharge lamp 8 is again put on. However, as shown in FIG. 5, because the voltage applied to the stabilizer 6 is alternatively set to 2 V and 12 V, the electric-discharge lamp 8 repeatedly flickers.

The flickering of the electric-discharge lamp 8 adversely influences on the running of the vehicle, and there is a problem that the life of the electric-discharge lamp 8 is shortened when the flickering of the electric-discharge lamp 8 is continued.

To avoid this problem in the first embodiment, the change of the instruction output from the electric-discharge lamp 8 is monitored to supervise the flickering of the electric-discharge lamp 8, and the electric-discharge lamp 8 is inhibited from being put on when an abnormal flickering of the electric-discharge lamp 8 is detected.

More precisely, as shown in FIG. 3, in cases where the instruction previously output from the lamp-lighting control unit 22b denotes a light-out instruction (step ST1), when a re-lighting instruction is currently output from the lamp-lighting control unit 22b (step ST2), a flickering number is incremented in the flickering number counting unit 23b (step ST4).

Also, in cases where the instruction previously output from the lamp-lighting control unit 22b denotes a re-lighting instruction (step ST1), when a light-out instruction is currently output from the lamp-lighting control unit 22b (step ST3), the flickering number is incremented in the flickering number counting unit 23b in the same manner (step ST4).

Thereafter, when the flickering number counted in the flickering number counting unit 23b exceeds a regular number (step ST5), a lamp-lighting inhibition instruction is output from the lamp-lighting inhibiting unit 24b to the outputting unit 25b to inhibit the electric-discharge lamp 8 from being put on (step ST6).

Therefore, unless the lamp-lighting inhibition instruction for the electric-discharge lamp 8 is canceled, the electric-discharge lamp 8 is not again put on. Therefore, the flickering of the electric-discharge lamp 8 can be avoided.

Here, even though the headlight is continuously used in the normal state, there is a case where the flickering number counted in the flickering number counting unit 23b is accumulatively increased and reaches the regular number. To avoid this problem, the number counted in the flickering number counting unit 23b is periodically reset to zero in the lamp-lighting inhibiting unit 24b. However, because the flickering number is incremented when the user operates the change-over switch 2, there is possibility that the lamp-lighting inhibition instruction is output according to the operation of the user.

Therefore, it is desired that a reset time period of the flickering number and the regular number are set to a combination of values which is not obtained in the normal use state. For example, a reset time period of the flickering number is set to 1 minute, and the regular number is set to about 20.

As is apparently described above, in the first embodiment, the number of flickering operations (that is, the flickering number) in the electric-discharge lamp 7 or 8 is counted, and the lighting of the electric-discharge lamp is inhibited when the flickering number exceeds the regular number. Therefore, the life of the electric-discharge lamp can be prevented from being shortened according to the flickering of the lamp.

Here, output states of the lamp-lighting control units 22a and 22b in a microcomputer are monitored by the flickering number counting units 23a and 23b and the lamp-lighting inhibiting units 24a and 24b, and the lighting of the electric-discharge lamp 7 or 8 is inhibited. Therefore, the inhibition of the lighting of the electric-discharge lamp 7 or 8 according to the first embodiment differs from that which is performed by monitoring voltages applied to the stabilizers 5 and 6.

More precisely, in cases where voltages applied to the stabilizers 5 and 6 are monitored to judge whether or not the electric-discharge lamp 7 or 8 flickers, when the voltage is considerably changed in a moment because of noise, there is probability that it is erroneously judged that the electric-discharge lamp 7 or 8 flickers. However, in cases where output states of the lamp-lighting control units 22a and 22b in a microcomputer are monitored according to the first embodiment, the judgment can be accurately performed without receiving the influence of the noise.

Embodiment 2

In the first embodiment, when the flickering number exceeds the regular number, the lighting of the electric-discharge lamp 7 or 8 is inhibited. However, in a second embodiment, even though the flickering number exceeds the regular number, it is preferred that the lighting of the electric-discharge lamp 7 or 8 is inhibited on condition that the flickering time period determined by the light-out of the electric-discharge lamp 7 or 8 and the re-lighting of the electric-discharge lamp 7 or 8 is shorter than a regular time period.

Accordingly, a problem that the lighting of the electric-discharge lamp 7 or 8 in the normal use state based on the normal use of the user is undesirably inhibited can be prevented.

For example, the lighting of the electric-discharge lamp 7 or 8 is inhibited only when a flickering frequency corresponding to the flickering time period exceeds ⅓ Hz.

Embodiment 3

In the first and second embodiments, coils of the halogen lamps 9 and 10 compose a part of the serial circuit. However, in a third embodiment, in cases where the electric-discharge lamps 7 and 8 are used in a two-lamp type headlight (one headlight is arranged on each of right and left sides), an optical axis of the lamp arranged on one side is moved up and down by a motor so as to alternately select a high beam and a low beam, and a solenoid of the motor is serially connected with the halogen lamps 9 and 10 of the first or second embodiment so as to function as a load having a serial resistance component. In this case, though the electric-discharge lamps 7 and 8 flicker, the flickering of the electric-discharge lamps 7 and 8 can be inhibited in the same manner as in the first and second embodiments.

As is described above, the electric-discharge lamp control apparatus and the electric-discharge lamp control method are generally appropriate to a voltage monitoring system in which a voltage applied to a stabilizer of an electric-discharge lamp is monitored, the electric-discharge lamp is put out when the voltage is out of an allowed voltage range, and the electric-discharge lamp is again put on when the voltage is returned within the allowed voltage range. In particular, the apparatus and the method are appropriate to a voltage monitoring system in which the lighting of the electric-discharge lamp is inhibited to prevent the life of the electric-discharge lamp from being shortened when an abnormal circumstance occurs and the electric-discharge lamp frequently flickers.

What is claimed is:

1. An electric-discharge lamp control apparatus, comprising:

lamp-lighting control means for monitoring a voltage applied to a stabilizer of an electric-discharge lamp, outputting a light-out instruction to turn off the electric-discharge lamp when the voltage is out of an allowed voltage range and outputting a re-lighting instruction to again turn on the electric-discharge lamp when the voltage is returned within the allowed voltage range;

counting means for monitoring a change of the instruction output from the lamp-lighting control means and for counting a number of the changes of the instruction by incrementing the number when the instruction changes from at least one of (a) the light-out instruction to the re-lighting instruction, and (b) the re-lighting instruction to the light-out instruction; and lamp-lighting inhibiting means for inhibiting the lighting of the electric-discharge lamp when the number counted by the counting means exceeds a predetermined number.

2. An electric-discharge lamp control apparatus according to claim 1, wherein the lamp-lighting inhibiting means resets the number counted by the counting means each time a predetermined time passes and inhibits the lighting of the electric-discharge lamp when the number counted within the predetermined time exceeds the predetermined number.

3. An electric-discharge lamp control apparatus according to claim 1, wherein the lamp-lighting inhibiting means inhibits the lighting of the electric-discharge lamp only when a time period determined by the light-out instruction and the re-lighting instruction is shorter than a predetermined time period.

4. An electric-discharge lamp control method, comprising the steps of:

monitoring a voltage applied to a stabilizer of an electric-discharge lamp;

outputting a light-out instruction to turn off the electric-discharge lamp when the voltage is out of an allowed voltage range and a re-lighting instruction to again turn on the electric-discharge lamp when the voltage is returned within the allowed voltage range;

turning off the electric-discharge lamp when the light-out instruction is output in the outputting step;

turning on the electric-discharge lamp when the re-lighting instruction is output the outputting step;

monitoring a change of the instruction output in the outputting step;

counting a number of the changes of the instruction by incrementing the number when the instruction changes from at least one of (a) the light-out instruction to the re-lighting instruction, and (b) the re-lighting instruction to the light-out instruction; and inhibiting the lighting of the electric-discharge lamp when the number counted in the counting step exceeds a predetermined number.

5. An electric-discharge lamp control method according to claim 4, wherein the step of inhibiting the lighting of the electric-discharge lamp includes the steps of:

resetting the number each time a predetermined time passes; and inhibiting the lighting of the electric-discharge lamp when the number counted within the predetermined time exceeds the predetermined number.

6. An electric-discharge lamp control method according to claim 4, wherein the step of inhibiting the lighting of the electric-discharge lamp includes the step of:

inhibiting the lighting of the electric-discharge lamp only when a time period determined by the light-out instruction and the re-lighting instruction is shorter than a predetermined time period.

7. An electric-discharge lamp control apparatus, comprising:

a lamp-lighting control unit which monitors a voltage applied to a stabilizer of an electric discharge lamp, outputs a light-out instruction to turn off the electric-discharge lap when the voltage is out of an allowed voltage range and outputs a re-lighting instruction to again turn on the electric-discharge lamp when the voltage is returned within the allowed voltage range;

a number counting unit which monitors a change of the instruction output from the lamp-lighting control unit and counts a number of the changes of the instruction by incrementing the number when the instruction changes from at least one of (a) the light-out instruction to the re-lighting instruction, and (b) the re-lighting instruction to the light-out instruction; and a lamp-lighting inhibiting unit which inhibits the lighting of the electric-discharge lamp when the number counted by the counting unit exceeds a predetermined number.

* * * * *